Patented Dec. 11, 1934

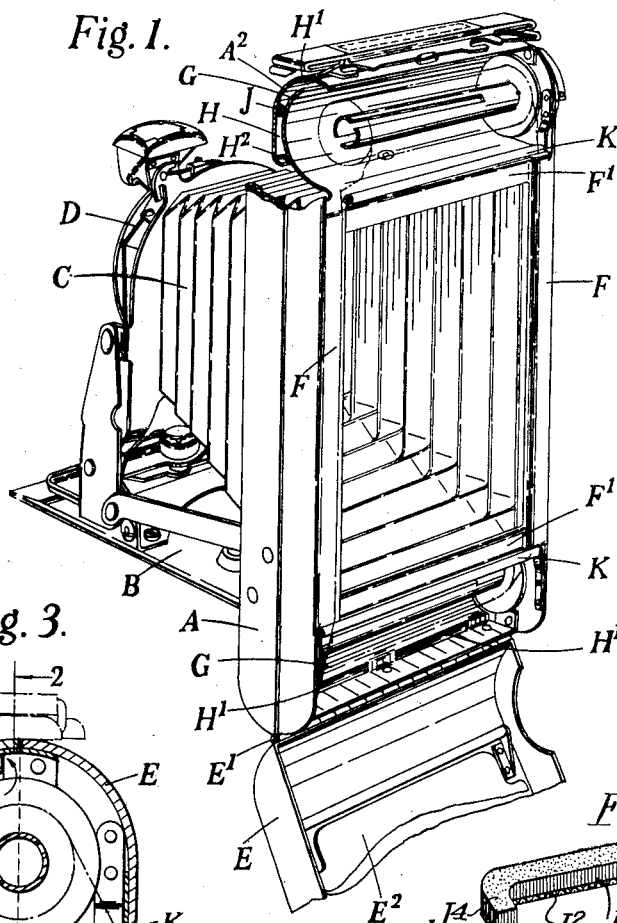
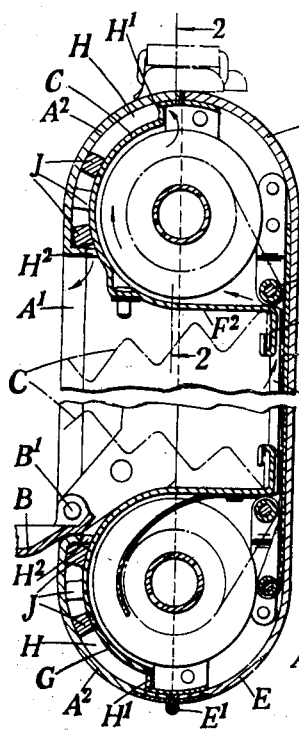
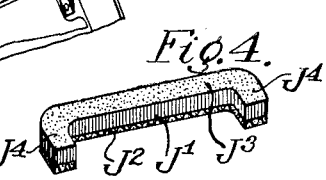
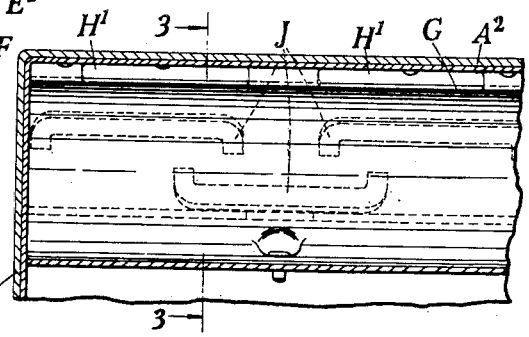

1,984,078

UNITED STATES PATENT OFFICE 1,984,078

PHOTOGRAPHIC CAMERA

Hugo Nagel, Harrow, England, assignor to Eastman Kodak Company, Rochester, N. Y., a corporation of New York Application August 9, 1933, Serial No. 684,388
In Great Britain August 11, 1932

12 Claims. (Cl. 95—32)

This invention relates to folding cameras of the kind in which the body comprises a film spool chamber at each end of the recess in which the bellows are housed when the camera is closed, and has for its object to provide improved passages or vents for the air which is entrapped by the opening or closing of the bellows.

According to this invention a curved wall partially surrounds one or each of the spool chambers and is spaced from the adjacent wall of the body so as to leave a narrow passage through which air entrapped by the opening or closing of the bellows can pass to or from the camera. Preferably the openings to the atmosphere are formed at or adjacent to each end of the central recess and in such a position that when the camera is shut these openings are wholly covered by the base board.

It will be readily appreciated that the location of the openings will necessarily vary in accordance with the external shape of the camera and the following is a description, by way of example only, of one preferred construction according to this invention with reference to the accompanying drawing, in which Figure 1 shows a camera in perspective with the back open, part of one of the spool chambers being broken away in order to show the arrangement of the air passages or vents according to this invention, Figure 2 is a sectional end elevation, on the line 2—2 of Figure 3, showing, on an enlarged scale, part of a spool chamber of the camera shown in Figure 1, Figure 3 is a sectional side elevation on the line 3—3 of Figure 2, showing, also on an enlarged scale, the spool chambers of the camera, and Fig. 4 is a perspective view of a modified form of light baffle which may be used in place of the light baffle shown in the other figures.

Whilst the arrangement of air passages or vents according to this invention can be employed with any suitable folding camera, it is shown, in the accompanying drawings, as applied to a folding camera having a self-erecting mechanism.

As shown in the figures, the body A of the camera is of known type comprising a central recess $A^1$ closed, when the camera is not in use, by means of a base board B hinged to it at $B^1$. The recess accommodates, when the base board B is closed, the bellows C, the lens and its supporting front D and the erecting mechanism.

The back E of the camera is hinged to the body at $E^1$ and, as shown most clearly in Figure 1, when opened exposes a rectangular frame defining the exposure aperture and two cylindrical spool chambers, one at each end of the frame. The rectangular frame comprises side members F which serve to guide the longitudinal edges of the film when it is stretched from the supply spool in the lower chamber to the take-up spool in the upper chamber and also end members $F^1$ which are slightly recessed so that they lie below the level of the side members F, the purpose of such recessing being more fully explained hereinafter.

Each spool chamber is formed partly by the camera body and partly by a curved wall G which consists of an extension of an inwardly directed flange $F^2$ on the adjacent frame member $F^1$, this flange constituting one end wall of the recess in the camera body (Figure 3). The curved wall G is spaced from the adjacent curved wall $A^2$ of the camera body so as to leave a narrow passage H between it and the wall $A^2$. The inner end of the curved wall G is provided with slots $H^1$ and similar slots $H^2$ are provided between the walls $A^3$ and G at their outer ends so that the slots $H^2$ open into the central recess $A^1$ in the camera body.

Between the curved walls G and $A^2$ are provided, preferably in staggered relationship, as shown in Figure 2, baffles J which constitute light traps to prevent light which may enter through the slots $H^2$, reaching the film in the spool chamber. Some or all of these baffles are conveniently formed of plush or similar material in order to prevent dust being drawn into the camera when, for example, the bellows are opened. This is shown by the detail Fig. 4.

In this figure the baffle $J^1$ is shown as being formed of plush material, there being a base $J^2$ of fabric from which the fibers extend upwardly terminating in the top $J^3$ which is of a sufficient height to barely touch the camera walls $A^2$ or G according to the position of the baffle. The ends of the baffle $J^1$ are curved as shown at $J^4$ and when the baffles are so arranged, while the major part of the air may pass around through the unobstructed passageway, nevertheless, the curved ends of the baffles filter out a certain amount of dirt or foreign matter and a certain amount of air is drawn to the nap or the fibers themselves.

A guide roller K is provided in each spool chamber over which the film passes to the exposure frame, and the surface of such roller engaged by the film lies in substantially the same plane as the surfaces of the frame members F which serve as guide tracks for the edges of the film. The film is held against the members F by a suitable spring pressure plate E² mounted on the inner surface of the back E, but owing to the recessing of the members F¹, there is a small gap or air passage between the face of the film and the guide rollers K over which the film passes as it leaves the supply spool or is wound on to the take-up spool. Hence when the camera is loaded the air which is compressed by the bellows C when it is closed passes between the ends of the film and the inner bars F¹ of the exposure opening into the spool chambers and thence through the slot H¹, the curved passages or vents H and out through the slots H² into the central recess. The base board B does not finally close until the air has been expelled through these openings and when the base board has been closed the outlet openings consisting of the slots H² are effectively protected.

Instead of both spool chambers being provided with air vents in the manner above described, only one of the chambers, for example that containing the supply spool, may have such an air vent, but obviously it is of advantage for both chambers to be furnished with an air vent partially surrounding the spool so that as the free space in one chamber becomes occupied by the film wound on to the spool, the air can escape more readily through the spool chamber at the opposite end of the camera.

It will be appreciated that the particular form of camera back and construction described above forms no part of the present invention and that any known form of bellows, lens mount and supports therefor can be adopted, although the invention is particularly suitable for folding cameras of the self-erecting type.

What I claim as my invention and desire to secure by Letters Patent is:—

1. In a folding camera having a body and a front connected thereto by an extensible bellows, the combination of a spool chamber within the body, and a curved wall partially surrounding the chamber and spaced from the adjacent wall of the body so as to leave a narrow passage through which air may pass freely to or from the bellows from outside of the camera.

2. In a folding camera having a body and a front connected thereto by an extensible bellows which is accommodated within a recess in the body, the combination of a spool chamber within the body, and a curved wall partially surrounding the spool chamber and spaced from the adjacent portion of the camera body to provide an air passage leading from the spool chamber to the atmosphere through at least one opening adjacent to the end of the recess.

3. In a folding camera having a body, a front connected thereto by an extensible bellows which is accommodated within a central recess in the body and two spool chambers one at each end of the central recess, the combination with each spool chamber of a curved wall forming part of the spool chamber and spaced from the adjacent portion of the camera body to provide an air passage leading from the spool chamber to the atmosphere through at least one opening near the adjacent end of the central recess.

4. In a folding camera having a body and a front connected thereto by an extensible bellows, the combination of a frame within the body and defining the exposure opening therein, and an extension at each end of the frame curved to form the inner wall of a spool chamber and so spaced from the adjacent wall of the camera body as to form a passage through which air may pass freely to and from the bellows when it is opened and closed.

5. In a folding camera having a body and a front connected thereto by an extensible bellows which is accommodated within a recess in the body, the combination of a spool chamber within the body, a curved wall partially surrounding the spool chamber and spaced from the adjacent portion of the camera body to provide an air passage leading from the spool chamber to the atmosphere through at least one opening adjacent to the end of the recess, and baffles between the curved wall and the adjacent portion of the camera body serving as light traps.

6. In a folding camera having a body and a front connected thereto by an extensible bellows which is accommodated within a recess in the body, the combination of a spool chamber within the body, a curved wall partially surrounding the spool chamber and spaced from the adjacent portion of the camera body to provide an air passage leading from the spool chamber to the atmosphere through at least one opening adjacent to the end of the recess, and baffles arranged in staggered relationship in the space between the curved wall and the adjacent portion of the camera body serving as light traps.

7. In a folding camera having a body and a front connected thereto by an extensible bellows which is accommodated within a recess in the body, the combination of a spool chamber within the body, a curved wall partially surrounding the spool chamber and spaced from the adjacent portion of the camera body to provide an air passage leading from the spool chamber to the atmosphere through at least one opening adjacent to the end of the recess, and baffles arranged in staggered relationship in the space between the curved wall and the adjacent portion of the camera body serving as light traps, at least one of such baffles being formed of a material having a pile so that it acts as a dust filter.

8. In a folding camera having a body and a front connected thereto by an extensible bellows, the combination of a frame within the body and defining the exposure opening therein, an extension at each end of the frame curved to form the inner wall of a spool chamber and so spaced from the adjacent wall of the camera body as to form a passage through which air compressed by the bellows when they are closed, can escape into the atmosphere, and plush baffles arranged in staggered relationship in the space between the curved extension and the adjacent wall of the camera body so as to act as dust filters and light traps.

9. In a folding camera having a body and a front connected thereto by an extensible bellows, the combination of a frame defining the exposure opening and over which the film passes, this frame being provided with at least one recess to facilitate the passage of air from the inside of the bellows, and an extension at each end of the frame curved to form the inner wall of a spool chamber and so spaced from the adjacent wall of the camera body as to form a passage through which air may pass freely to and from the bellows when it is opened and closed.

10. A folding camera comprising, in combination, a camera body, a front connected to the body by an extensible bellows which is accommodated within a recess in the body when the camera is closed, a spool chamber within the body and a curved wall partially surrounding the chamber and spaced from the adjacent wall of the body so as to leave a narrow passage through which air may pass freely to and from the bellows when the bellows is opened and closed.

11. A folding camera comprising, in combination, a camera body, a front connected to the body by an extensible bellows which is accommodated within a recess in the body when the camera is closed, a spool chamber within the body, a curved wall partially surrounding the spool chamber and spaced from the adjacent portion of the camera body to provide an air passage leading from the spool chamber to the atmosphere through at least one opening adjacent to the end of the recess, and baffles arranged in staggered relationship in the space between the curved wall and the adjacent portion of the camera body serving as light traps.

12. A folding camera comprising, in combination, a camera body, a baseboard hinged to the body, a front connected to the body by extensible bellows which is accommodated within a central recess in the body when the camera is closed, erecting mechanism for supporting the front on the baseboard when the camera is open, two spool chambers within the body, one at each end of the central recess, a frame defining the exposure opening and over which the film passes, this frame being provided with at least one recess to facilitate the passage of air from the inside of the bellows to the spool chambers, an extension at each end of the frame curved to form the inner wall of the adjacent spool chamber and spaced from the adjacent wall of the camera body to provide an air passage from the spool chamber to at least one opening to the atmosphere adjacent to the end of the central recess, and plush baffles arranged in staggered relationship in the air passage so as to act as dust filters and light traps.

HUGO NAGEL.